(12) United States Patent
Tsai et al.

(10) Patent No.: US 11,456,549 B2
(45) Date of Patent: Sep. 27, 2022

(54) POWER BACKPLANE ASSEMBLY AND POWER SUPPLY MODULE

(71) Applicant: FSP TECHNOLOGY INC., Taoyuan (TW)

(72) Inventors: Chien-Li Tsai, Taoyuan (TW); Yao-Cheng Tsai, Taoyuan (TW)

(73) Assignee: FSP TECHNOLOGY INC., Taoyuan (TW)

( * ) Notice: Subject to any disclaimer, the term of this patent is extended or adjusted under 35 U.S.C. 154(b) by 409 days.

(21) Appl. No.: 16/742,914

(22) Filed: Jan. 15, 2020

(65) Prior Publication Data

US 2020/0274271 A1    Aug. 27, 2020

(30) Foreign Application Priority Data

Feb. 22, 2019   (TW) ................................. 108106104

(51) Int. Cl.
*H01R 12/70* (2011.01)
*G06F 1/18* (2006.01)

(52) U.S. Cl.
CPC ......... *H01R 12/7088* (2013.01); *G06F 1/189* (2013.01)

(58) Field of Classification Search
CPC ..... H01R 12/7088; G06F 1/189; G06F 1/188; G06F 1/263; H02M 1/00
See application file for complete search history.

(56) References Cited

U.S. PATENT DOCUMENTS

| 2010/0177465 A1* | 7/2010 | Lu ........................... G06F 1/182 361/679.01 |
| 2010/0177472 A1* | 7/2010 | Chang ....................... G06F 1/26 361/679.02 |
| 2010/0254097 A1* | 10/2010 | Lu ......................... H05K 5/0247 361/748 |
| 2011/0161684 A1* | 6/2011 | Chen ....................... G06F 1/266 713/300 |
| 2012/0049819 A1* | 3/2012 | Mao ....................... H02J 1/001 323/234 |
| 2012/0194089 A1* | 8/2012 | Sun ........................ H05B 45/10 315/200 R |

(Continued)

FOREIGN PATENT DOCUMENTS

| TW | M381826 | 6/2010 |
| TW | M459676 | 8/2013 |
| TW | I509400 | 11/2015 |

Primary Examiner — Pinping Sun
(74) Attorney, Agent, or Firm — JCIPRNET (57) ABSTRACT

A power backplane assembly is adapted to be connected to a power supply. The power supply outputs a first voltage. The power backplane assembly includes a backplane body, a conversion circuit board, and an output circuit board. The backplane body is for plugging in the power supply. The conversion circuit board is electrically connected to the backplane body. The backplane body is adapted to deliver the first voltage to the conversion circuit board. The conversion circuit board converts the first voltage into a second voltage. The output circuit board is electrically connected to the conversion circuit board and includes a first output connector and a second output connector. The first output connector is configured to output the first voltage, and the second output connector is at least configured to output the second voltage. A power supply module which has the power backplane assembly is also provided.

16 Claims, 5 Drawing Sheets

(56) References Cited

U.S. PATENT DOCUMENTS

| | | | |
|---|---|---|---|
| 2013/0314850 A1* | 11/2013 | Takahashi | H02B 1/56 |
| | | | 361/678 |
| 2015/0303815 A1* | 10/2015 | Chen | H02M 3/158 |
| | | | 363/21.04 |
| 2016/0316586 A1* | 10/2016 | Lai | G06F 1/189 |
| 2018/0254638 A1* | 9/2018 | Bonilla | H02J 4/00 |

* cited by examiner

POWER BACKPLANE ASSEMBLY AND POWER SUPPLY MODULE

CROSS-REFERENCE TO RELATED APPLICATION

This application claims the priority benefit of Taiwan application serial no. 108106104, filed on Feb. 22, 2019. The entirety of the above-mentioned patent application is hereby incorporated by reference herein and made a part of this specification.

BACKGROUND

Field of the Invention

The invention relates to a power backplane assembly and a power supply module, and more particularly, to a CRPS power backplane assembly and a power supply module capable of outputting multiple voltages.

Description of Related Art

In response to the arrival of the IoT era, power supplies used to support big data operations and automated applications, such as cloud, network communication, storage, enterprise servers and workstations etc., have also transformed. The various power supply products on the market have developed towards having features such as higher efficiency, higher power density and being equipped with intelligent functions. In order to unify the size of the many server power supplies available on the market, Intel revised the version 2.0 power design principles in May 2017 which specify the latest CRPS (Common Redundant Power Supply) size and other hardware functions, which became the design guidelines of the server power supplies currently available on the market. However, an output voltage of the CRPS power supply is only output at 12V, which cannot meet voltage requirements of various external devices.

SUMMARY

The invention provides a power backplane assembly that has the advantage of being able to output a variety of voltages.

The invention provides a power supply module which has the power supply module described above.

A power backplane assembly of the invention is adapted to be connected to a power supply. The power supply outputs a first voltage. The power backplane assembly includes a backplane body, a conversion circuit board, and an output circuit board. The backplane body is for plugging in the power supply. The conversion circuit board is electrically connected to the backplane body. The backplane body is adapted to deliver the first voltage to the conversion circuit board. The conversion circuit board converts the first voltage into a second voltage. The output circuit board is electrically connected to the conversion circuit board, and the output circuit board includes a first output connector and a second output connector. The first output connector is configured to output the first voltage, and the second output connector is at least configured to output the second voltage.

In an embodiment of the invention, the power backplane assembly further includes a plurality of conductive members. The backplane body has a first surface and a second surface opposite to each other, and the backplane body includes a backplane connector disposed on the first surface. The power supply is plugged in the backplane connector. The first conductive members are disposed between the second surface of the backplane body and the conversion circuit board to electrically connect the backplane body to the conversion circuit board.

In an embodiment of the invention, the first conductive members include a plurality of copper rails, a plurality of copper pillars or a plurality of wires.

In an embodiment of the invention, the power backplane assembly further includes a plurality of second conductive members disposed between the conversion circuit board and the output circuit board to electrically connect the conversion circuit board to the output circuit board.

In an embodiment of the invention, the second conductive members include a plurality of copper rails, a plurality of copper pillars or a plurality of wires.

In an embodiment of the invention, the cooper pillars penetrate the conversion circuit board.

In an embodiment of the invention, the output circuit board has a third surface and a fourth surface opposite to each other, the third surface faces the conversion circuit board, and the first output connector and the second output connector are disposed on the fourth surface.

In an embodiment of the invention, the second output connector outputs the first voltage and the second voltage.

In an embodiment of the invention, the second output connector is a standard 24-pin connector.

A power supply module of the invention includes a power supply and the power backplane assembly described above. The power supply outputs a first voltage. The power supply is plugged in the backplane body of the power backplane assembly. The conversion circuit board of the power backplane assembly converts the first voltage into the second voltage. The first output connector of the output circuit board outputs the first voltage, and the second output connector at least outputs the second voltage.

Based on the above, the power backplane assembly of the invention includes the backplane body connected to the power supply, the conversion circuit board connected to the backplane body, and the output circuit board connected to the conversion circuit board. The backplane body of the power backplane assembly of the invention receives the first voltage of the power supply. The conversion circuit board of the power backplane assembly converts a part of the first voltage into the second voltage to be delivered to the output circuit board, so as to provide a plurality of different output voltages.

To make the aforementioned more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Figure 1:
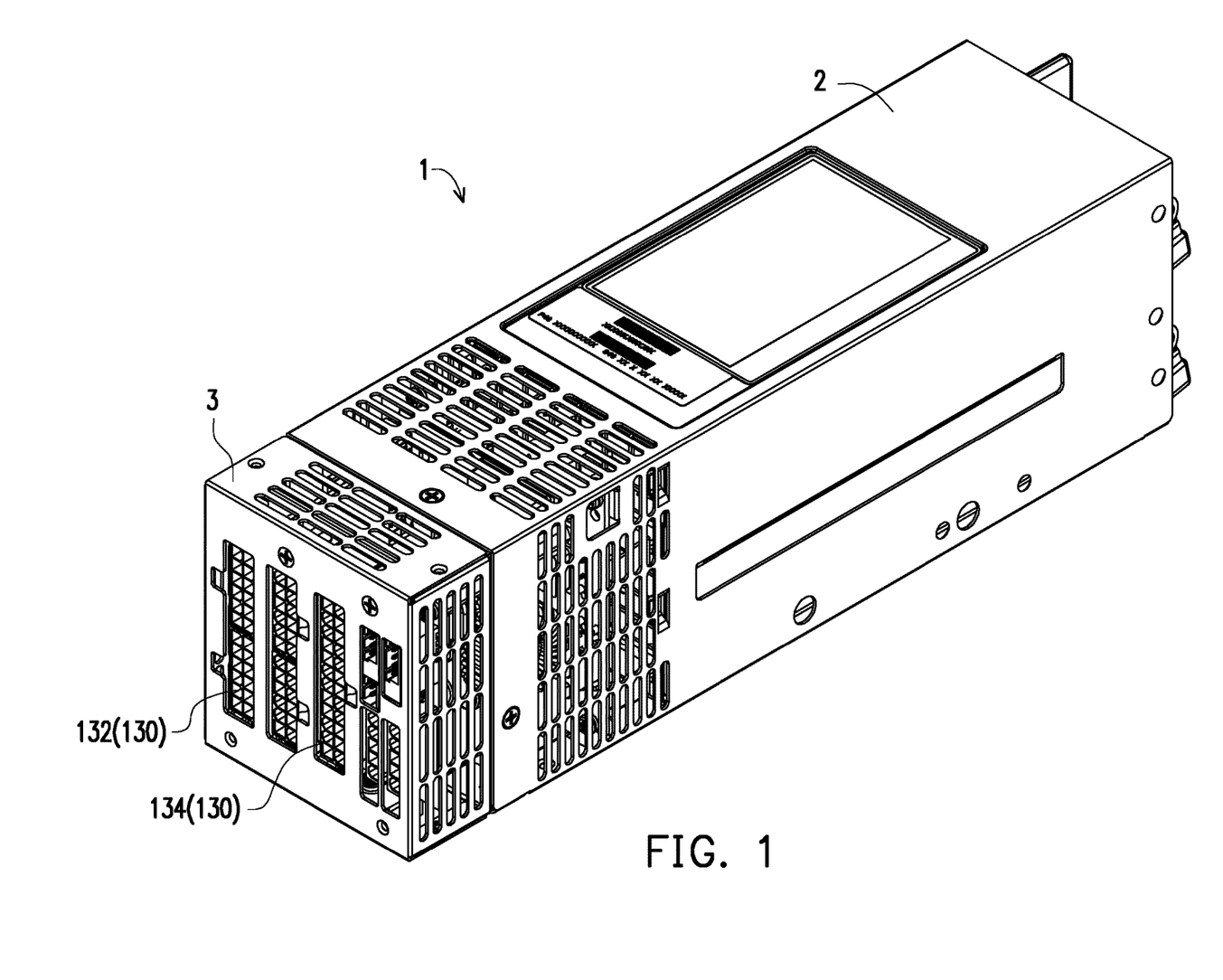
FIG. 1 is a perspective view of a power supply module according to an embodiment of the invention.
Figure 2:
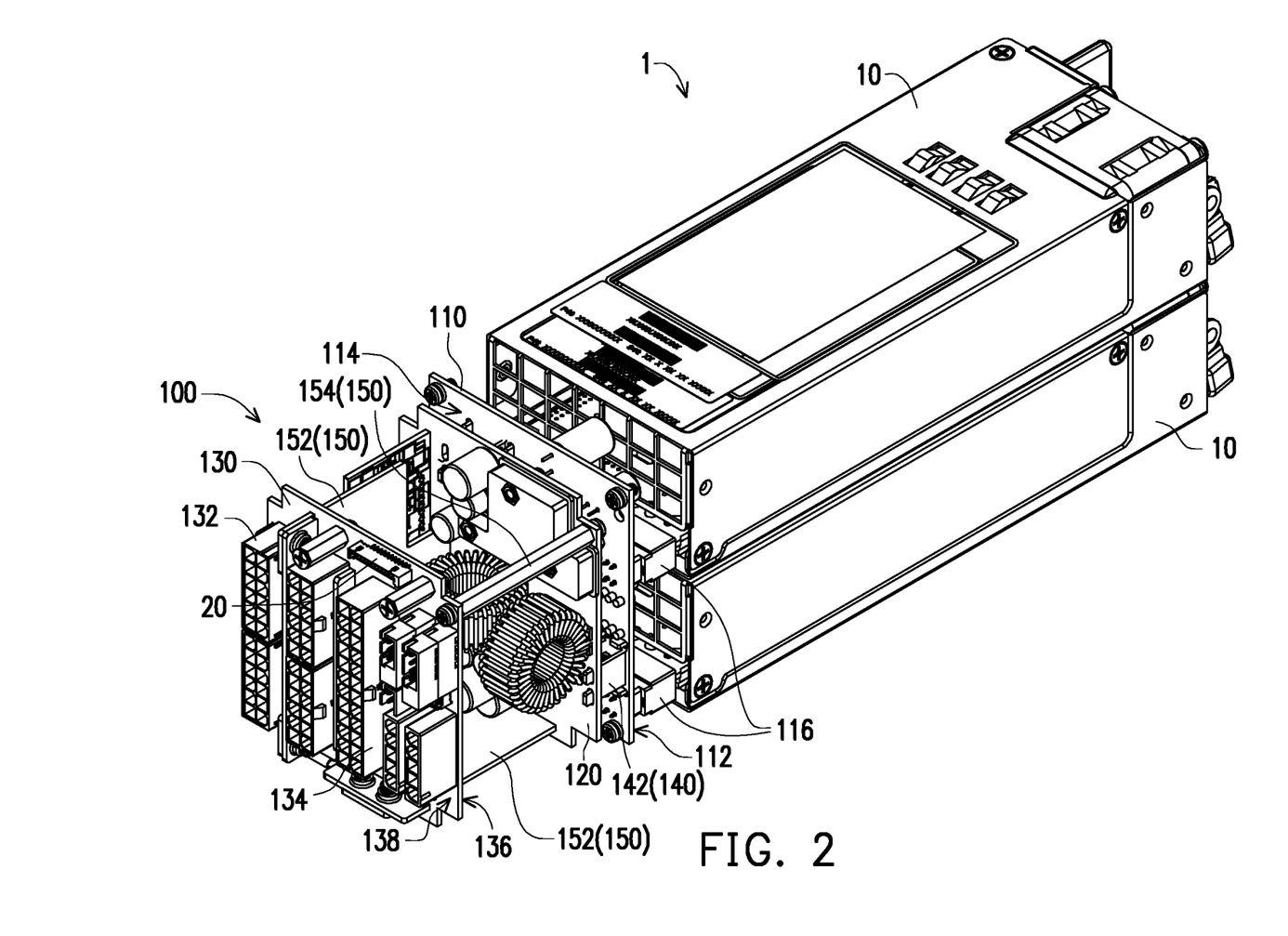
FIG. 2 is an internal perspective view of the power supply module of FIG. 1.

FIG. 1 is a perspective view of a power supply module according to an embodiment of the invention. FIG. 2 is an internal perspective view of the power supply module of FIG. 1. It should be noted that FIG. 1 illustrates a state in which a power supply module 1 is provided with outer casings 2 and 3. In order to clearly describe the power supply module 1 of the invention, the power supply module 1 of FIG. 2 omits the outer casings 2 and 3.

Referring to FIG. 1 and FIG. 2, in this embodiment, the power supply module 1 includes at least one power supply 10 and a power backplane assembly 100. In this embodiment, as illustrated, the number of the at least one power supply 10 is two. Nonetheless, in other embodiment not shown, the number of at least one power supply 10 may be adjusted according to actual needs. The invention is not intended to limit the number of the at least one power supply 10.

The power backplane assembly 100 includes a backplane body 110, a conversion circuit board 120, and an output circuit board 130. The power supply 10 is plugged in the backplane body 110 of the backplane body 100.

Figure 3:
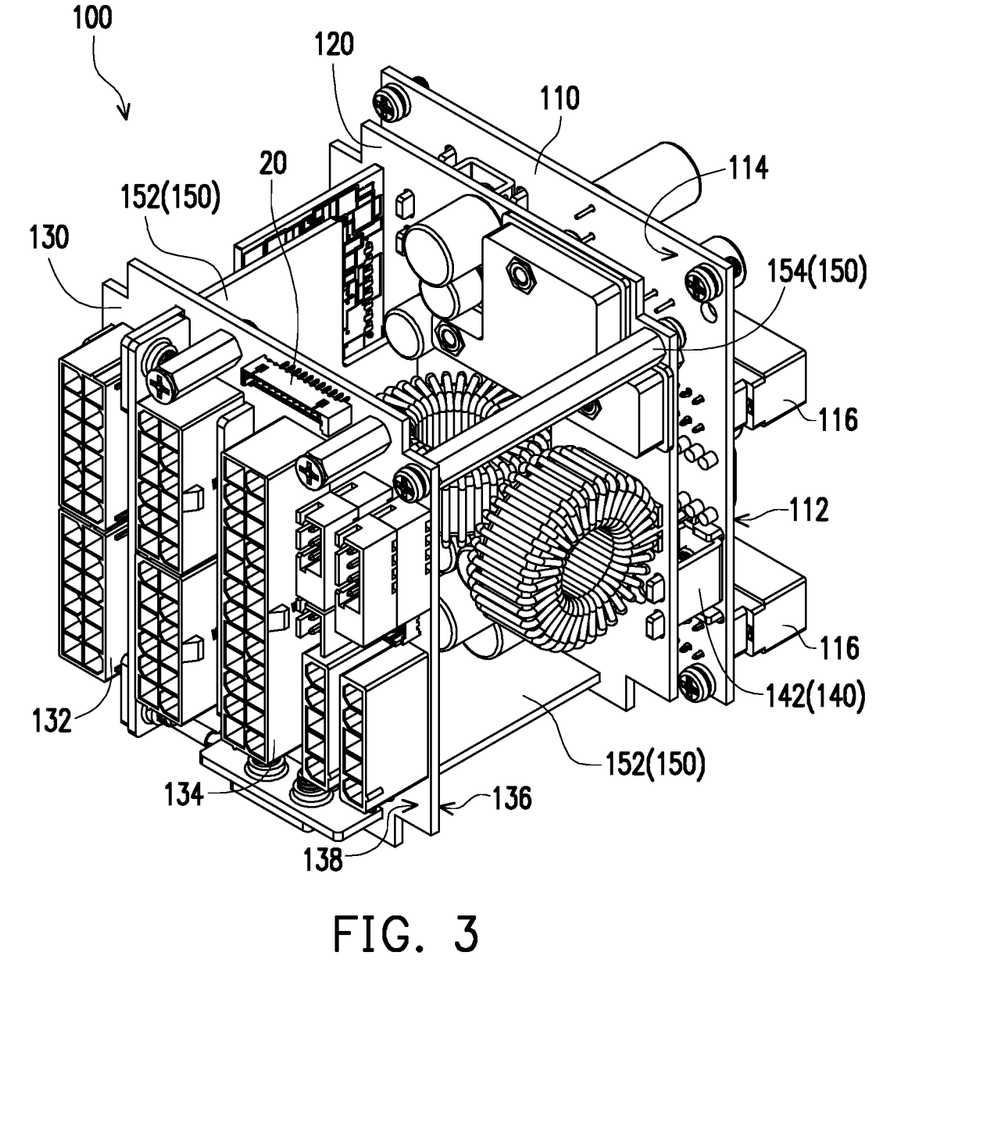
FIG. 3 is a perspective view of a power backplane assembly of the power supply module of FIG. 1.
Figure 4:
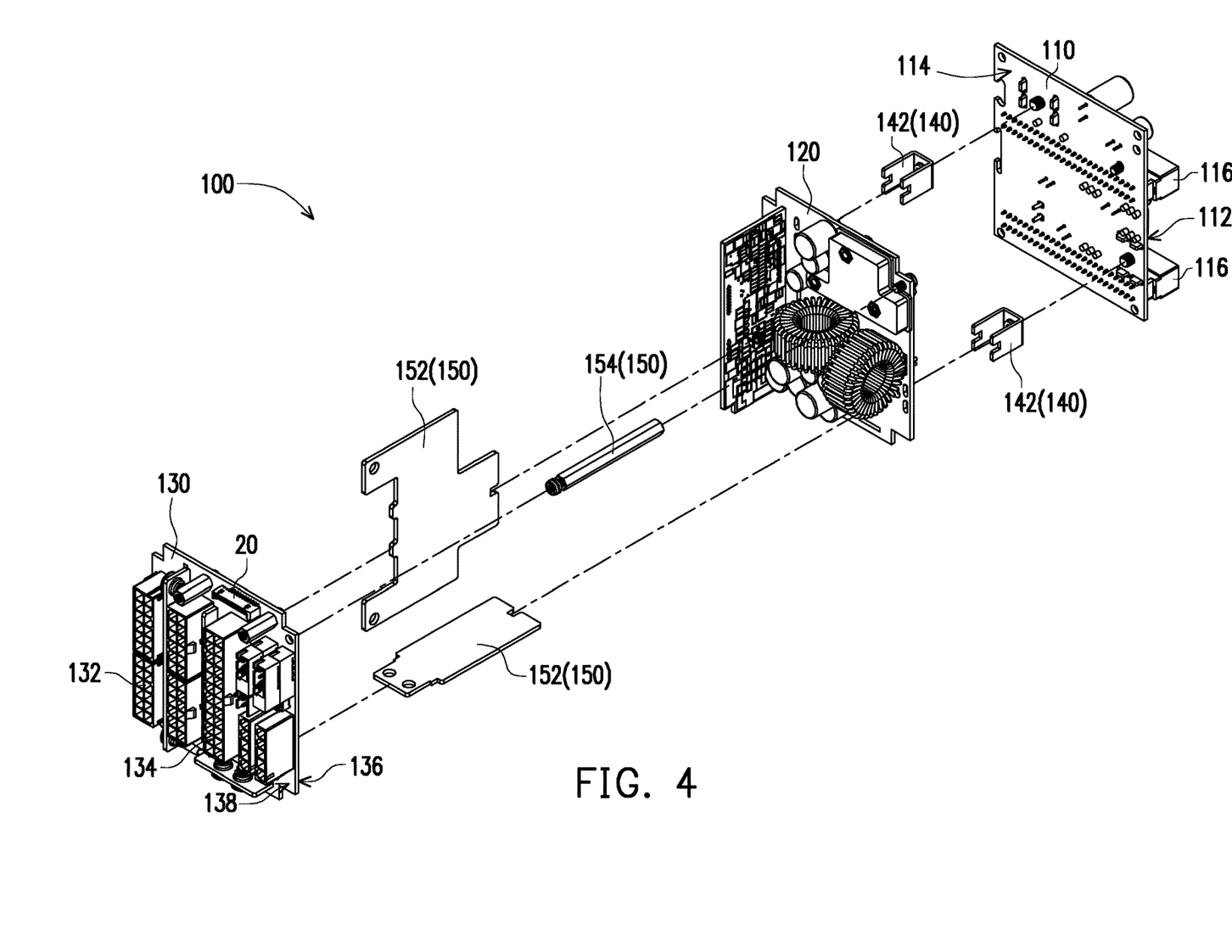
FIG. 4 is a perspective exploded view of FIG. 1.

Specifically, FIG. 3 is a perspective view of a power backplane assembly of the power supply module of FIG. 1. FIG. 4 is a perspective exploded view of FIG. 1. Referring to FIG. 3 and FIG. 4, in this embodiment, the backplane body 110 has a first surface 112 and a second surface 114 opposite to each other and includes a backplane connector 116 disposed on the first surface 112, and the power supply 10 (FIG. 2) is plugged in the backplane connector 116 of the backplane body 110. The power supply 10 is configured to provide a first voltage to the backplane body 110.

In addition, the conversion circuit board 120 is electrically connected to the backplane body 110. In this embodiment, the power backplane assembly 100 further includes a plurality of first conductive members 140. The first conductive members 140 are disposed between the second surface 114 of the backplane body 110 and the conversion circuit board 120 to electrically connect the backplane body 110 to the conversion circuit board 120. When the conversion circuit board 120 receives the first voltage from the backplane body 110, the conversion circuit board 120 can at least convert a part of the first voltage into a second voltage.

Further, the output circuit board 130 has a third surface 136 and a fourth surface 138, and the third surface 136 faces the conversion circuit board 120. The output circuit board 130 is electrically connected to the conversion circuit board 120. More specifically, the power backplane assembly 100 includes a plurality of second conductive members 150. The second conductive members 150 are disposed between the conversion circuit board 120 and the output circuit board 130 to electrically connect the conversion circuit board 120 to the output circuit board 130.

In this embodiment, the output circuit board 130 further includes a first output connector 132 and a second output connector 134. The first output connector 132 and the second output connector 134 are disposed on the fourth surface 138 of the output circuit board 130. The first output connector 132 is configured to output the first voltage, and the second output connector 134 is at least configured to output the second voltage.

In other words, in this embodiment, the conversion circuit board 120 allows a part of voltage from the backplane body 110 to pass through in form of the first voltage to be delivered to the first output connector 132 of the output circuit board 130, which then outputs the first voltage. In addition, the conversion circuit board 120 at least converts a part of the first voltage into the second voltage to be output by the second output connector 134. In this embodiment, the first voltage is, for example, 12 volts, and the second voltage is, for example, 3.3 volts or 5 volts. Naturally, values of the first voltage and the second voltage are not limited to the above.

Figure 5:
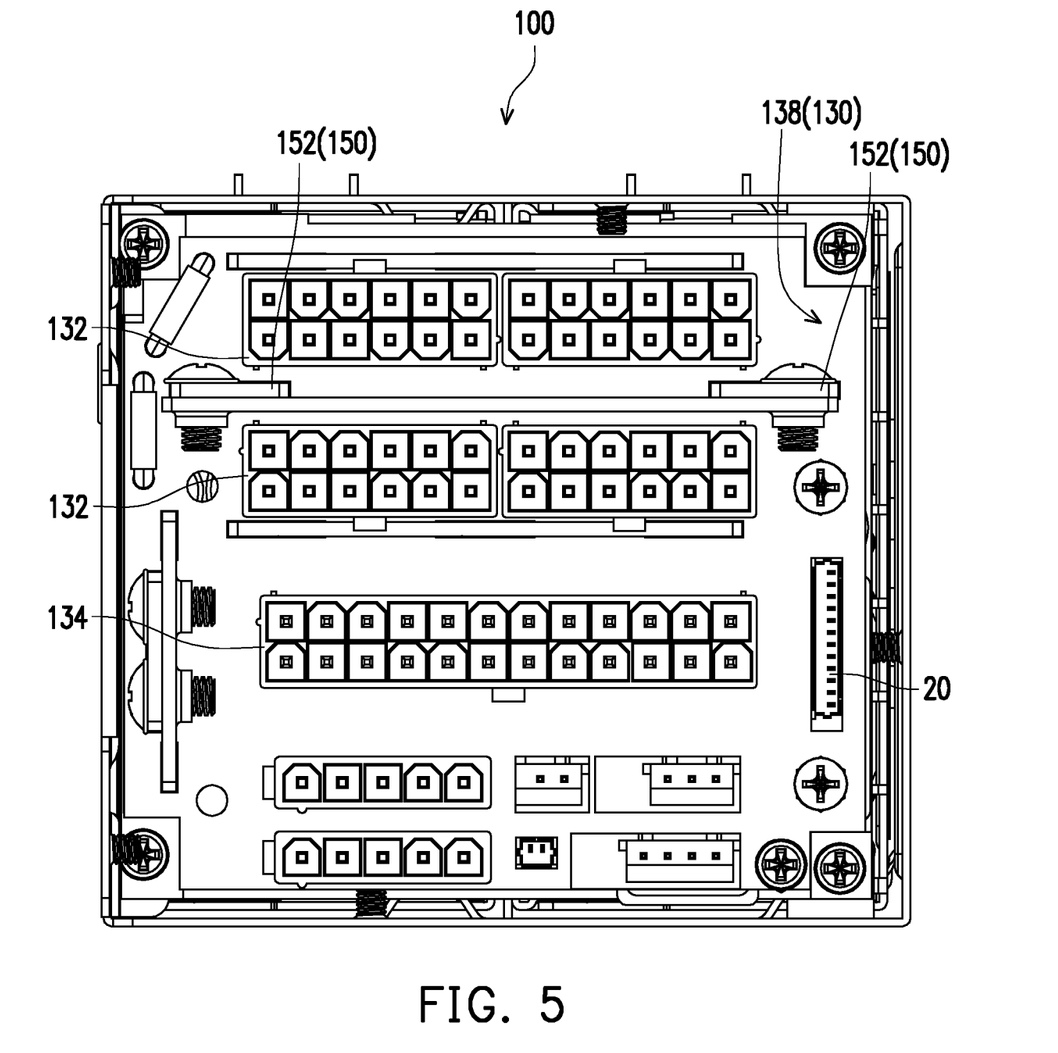
FIG. 5 is a front view of FIG. 1.

It should be noted that the conversion circuit board 120 of the power backplane assembly 100 of the present embodiment can convert not only the first voltage into the second voltage but also other voltages. FIG. 5 is a front view of FIG. 1. Referring to FIG. 5, in this embodiment, the second output connector 134 of the output circuit board 130 is exemplified by a standard 24-pin connector, and the second output connector 134 is capable of outputting 3.3 volts, −12 volts, 12 volts, and 5 Volt standby voltages (Vsb) and so on. That is to say, the power supply module 1 of the present embodiment can supply more than two voltages. In other words, the number of voltage forms that the power supply module 1 can output is not within the limits of the invention. Moreover, the numbers and types of the first output connector 132 and the second output connector 134 may also be adjusted as needed, and the invention is not limited thereto.

In addition, as shown in FIG. 5, in this embodiment, a bus connector 20 with SATA interface is further provided on the fourth surface 138 of the output circuit board 130. Naturally, in other embodiments, voltage output ranges, types and configurations of the connectors may be adjusted according to actual needs, and the invention is not limited thereto.

It is worth noting that since the wattage supplied by the power supply module 1 is quite large, the amount of current passing through the power supply backplane assembly 100 can be considerable large. Therefore, a very large number of wires may be required between the backplane body 110 and the conversion circuit board 120 and between the conversion circuit board 120 and the output circuit board 130 to be able to load and deliver such amount of current.

Returning to FIG. 3, in this embodiment, the first conductive members 140 and the second conductive members 150 may include a plurality of copper rails 142 and 152 and a copper pillar 154. Because current loads of the copper rails 142 and 152 and the copper pillar 154 are larger than normal wires, when these copper rails 142 and 152 and the copper pillar 154 are used as the conductive members, a large number of wire structures can be simplified and the volume can be reduced. Accordingly, the difficulties in installation and repairing due to the mess of excessive wires can be reduced.

Further, in this embodiment, as shown in FIG. 3 and FIG. 4, since the copper rails 152 and the cooper pillar 154 penetrate the conversion circuit board 120 and the output circuit board 130 and the copper rails 142 penetrate the output circuit board 130, a positioning function may be achieved. On the other hand, the power backplane assembly 100 of the present embodiment needs to be plugged in an external electrical connector (e.g., an electrical connector at a server end) and thus needs to withstand a certain frequency of disassembly and insertion. The copper rails 142, 152 and the copper pillar 154 are large in structural strength and capable of increasing connection strength between the backplane body 110 and the conversion circuit board 120 and connection strength between the conversion circuit board 120 and the output circuit board 130 to improve an overall structural strength of the power backplane assembly 100. Naturally, in other embodiments, it is also possible that the copper rails 142 and 152 and the copper pillars 154 do not penetrate the conversion circuit board 120 or the output circuit board 130, and the invention is not limited thereto.

Furthermore, in this embodiment, the copper rails 142 and 152 and the copper pillar 154 can provide a heat dissipation function. More specifically, since copper itself has better thermal conductivity, the copper rails 142 and 152 of the present embodiment are designed in the same form as a heat sink to provide a large heat dissipation surface, so that the first conductive members 140 and the second conductive members 150 can achieve an additional effect of dissipating heat. Naturally, in other embodiments, forms of the first conductive members 140 and thee second conductive members 150 may be adjusted according to actual needs, and the invention is not limited thereto.

It should be noted that the first conductive members 140 and the second conductive members 150 may be any one or a combination of at least two of the copper rails 142, the copper pillar 154 and wires. In addition, in other embodiments, other conductive members may be selected. In other words, the number, type, and shape of the conductive members may be adjusted as needed, and the invention is not limited thereto.

In summary, the power backplane assembly of the invention includes the backplane body connected to the power supply, the conversion circuit board connected to the backplane body, and the output circuit board connected to the conversion circuit board. The power backplane assembly converts a part of the first voltage from the backplane body into the second voltage using the conversion circuit board such that the output circuit board can at least output the first voltage and the second voltage. Further, in an embodiment, the copper rails or/and the copper pillars may be used to connect the backplane body with the conversion circuit board and connect the conversion circuit board with the output circuit board. Because the copper rails or/and the copper pillar can withstand a large amount of current, in addition to simplifying the structure of the power backplane assembly, improving the convenience of assembly and maintenance and providing the advantage of withstanding a frequent plugging, the structure of the power backplane assembly can be positioned and stabilized and a favorable heat dissipation can also be provided.

Although the invention has been described with reference to the above embodiments, it will be apparent to one of ordinary skill in the art that modifications to the described embodiments may be made without departing from the spirit of the invention. Accordingly, the scope of the invention will be defined by the attached claims and not by the above detailed descriptions.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A common redundant power supply (CRPS) power backplane assembly, comprising:
    a backplane body for plugging in at least two power supplies and each power supply outputting a first voltage which is 12V;
    a conversion circuit board electrically connected to the backplane body, the conversion circuit board parallel to but not on the same plane as the backplane body, the conversion circuit board directly receiving the first voltage from the backplane body and converting the first voltage into a second voltage; and
    an output circuit board electrically connected to the conversion circuit board, the output circuit board parallel to but not on the same plane as the conversion circuit board, the output circuit board directly receiving the second voltage from the conversion circuit board, the output circuit board comprising a first output connector and a second output connector, wherein the first output connector is configured to output the first voltage, and the second output connector is configured to output the first voltage and the second voltage.

2. The CRPS power backplane assembly according to claim 1, further comprising:
    a plurality of first conductive members, wherein the backplane body has a first surface and a second surface opposite to each other and comprises a backplane connector disposed on the first surface, the power supply is plugged in the backplane connector, and the plurality of first conductive members are disposed between the second surface of the backplane body and the conversion circuit board to electrically connect the backplane body to the conversion circuit board.

3. The CRPS power backplane assembly according to claim 2, wherein the plurality of first conductive members comprise a plurality of copper rails, a plurality of copper pillars or a plurality of wires.

4. The CRPS power backplane assembly according to claim 1, further comprising:
    a plurality of second conductive members disposed between the conversion circuit board and the output circuit board to electrically connect the conversion circuit board to the output circuit board.

5. The CRPS power backplane assembly according to claim 4, wherein the plurality of second conductive members comprise a plurality of copper rails, a plurality of copper pillars or a plurality of wires.

6. The CRPS power backplane assembly according to claim 5, wherein the plurality of copper rails penetrate the output circuit board.

7. The CRPS power backplane assembly according to claim 1, wherein the output circuit board has a third surface and a fourth surface opposite to each other, the third surface faces the conversion circuit board, and the first output connector and the second output connector are disposed on the fourth surface.

8. The CRPS power backplane assembly according to claim 1, wherein the second output connector is a standard 24-pin connector.

9. A power supply module, comprising:
    the at least two power supplies and each power supply outputting the first voltage; and
    the CRPS power backplane assembly according to claim 1, the power supply being plugged in the backplane body of the CRPS power backplane assembly, the conversion circuit board of the CRPS power backplane assembly converting the first voltage into the second voltage, the first output connector of the output circuit board outputting the first voltage, and the second output connector at least outputting the second voltage.

10. The power supply module according to claim 9, the CRPS power backplane assembly further comprising:

a plurality of first conductive members, wherein the backplane body has a first surface and a second surface opposite to each other and comprises a backplane connector disposed on the first surface, the power supply is plugged in the backplane connector, and the first conductive members are disposed between the second surface of the backplane body and the conversion circuit board to electrically connect the backplane body to the conversion circuit board.

11. The power supply module according to claim 10, wherein the plurality of first conductive members comprise a plurality of copper rails, a plurality of copper pillars or a plurality of wires.

12. The power supply module according to claim 9, the CRPS power backplane assembly further comprising:

a plurality of second conductive members disposed between the conversion circuit board and the output circuit board to electrically connect the conversion circuit board to the output circuit board.

13. The power supply module according to claim 12, wherein the plurality of second conductive members comprise a plurality of copper rails, a plurality of copper pillars or a plurality of wires.

14. The power supply module according to claim 13, wherein the plurality of copper rails penetrate the output circuit board.

15. The power supply module according to claim 9, wherein the output circuit board has a third surface and a fourth surface opposite to each other, the third surface faces the conversion circuit board, and the first output connector and the second output connector are disposed on the fourth surface.

16. The power supply module according to claim 9, wherein the second output connector is a standard 24-pin connector.

* * * * *